Feb. 3, 1931.        J. W. FLENNIKEN            1,791,056
                     INDICATING DEVICE
                    Filed July 17, 1928         2 Sheets-Sheet 1
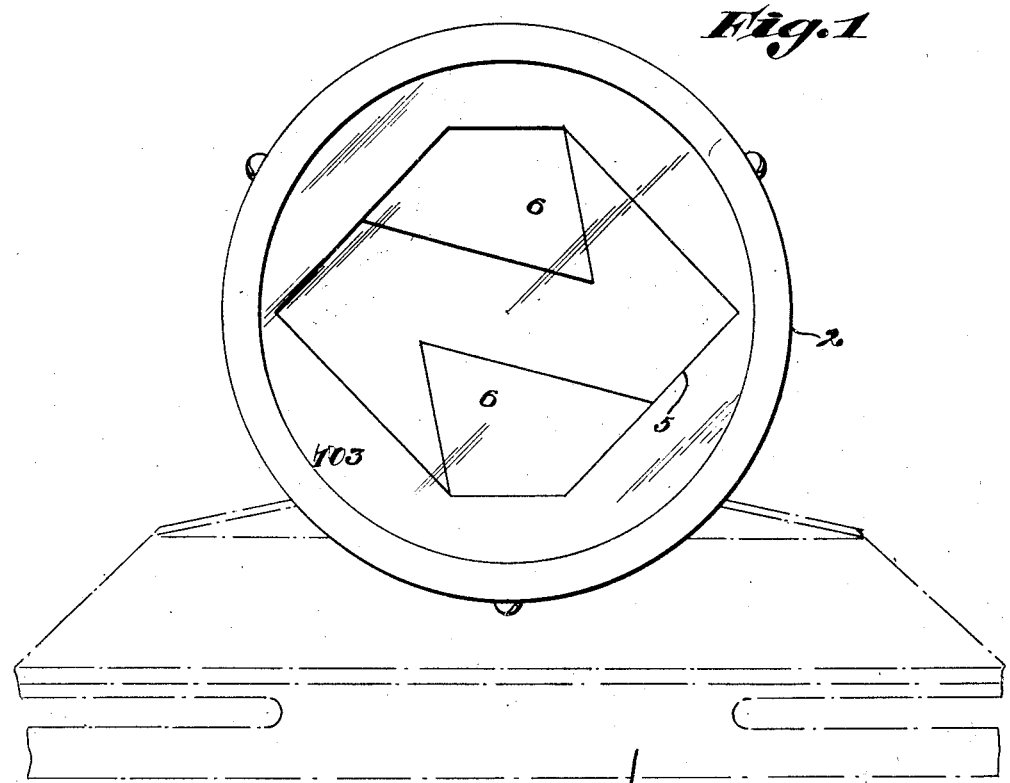
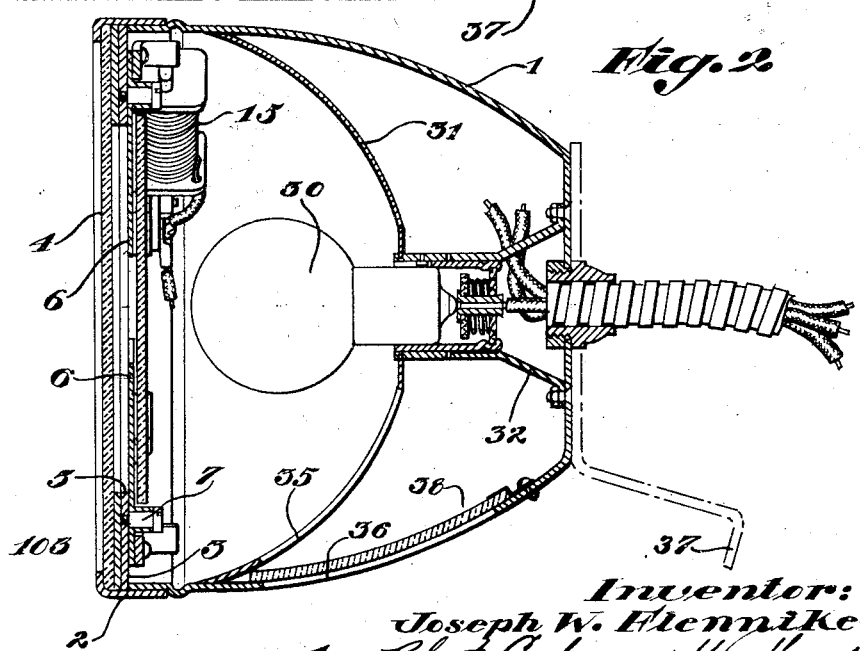
Inventor:
Joseph W. Flenniken
by Roberts, Cushman & Woodbury.
Attys.

Feb. 3, 1931.   J. W. FLENNIKEN   1,791,056
INDICATING DEVICE
Filed July 17, 1928   2 Sheets-Sheet 2

Inventor:
Joseph W. Flenniken
by Roberts, Cushman & Woodbury
Attys.

Patented Feb. 3, 1931

1,791,056

UNITED STATES PATENT OFFICE

JOSEPH W. FLENNIKEN, OF LYNN, MASSACHUSETTS

INDICATING DEVICE

Application filed July 17, 1928. Serial No. 293,350.

This invention relates to signal devices, and more particularly to a combined tail light and direction indicator for vehicles, certain features of the invention being generally applicable to direction indicators, whether combined with tail lights or not. The present invention is designed to permit the installation of a single signal light upon the rear of the vehicle, which is arranged not only to act as a tail light but also as a direction indicator and, if desired, as an attention or stop light.

This device preferably is provided with shutter means arranged to alter the effective shape of the red (or other colored) field which may serve as the rear lens for the tail light. Certain aspects of the invention relate to the arrangement of the actuating and controlling means for the shutters, the structural arrangement of the same and related parts, and the arrangement of the light source in conjunction with the same.

This invention therefore has for objects, among others, the provision of a direction indicating device which is simple, compact, and comparatively inexpensive, which has its direction indicating elements clearly visible even under adverse conditions and which may also be used as a stop light; and further, to the arrangement of a device of this character in a convenient and compact combination with a tail light designed to illuminate the conventional license plate and to give a warning signal at the rear of a vehicle.

In the accompanying drawings,

Fig. 1 is an elevational view of the rear (or lens portion) of the combined tail and direction indicating light;

Fig. 2 is a central vertical section through the same;

Figure 3:
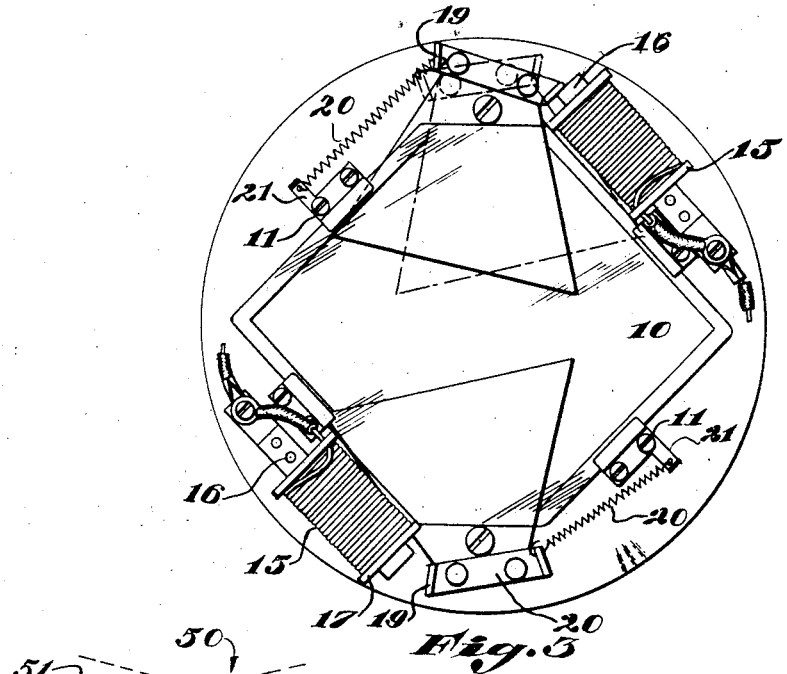
Fig. 3 is an elevational view of the lens plate, shutter elements and related parts.

Referring to the accompanying drawings and more particularly to Figs. 1 and 2 thereof, it is evident that the improved signal device may have a suitable casing 1 which is provided with an annular cover or retaining ring 2. Mounted within the end of the casing 1 is a glass plate 4 and an opaque plate 3 having a substantially square opening 5 therein which preferably is arranged with its longer dimensions vertically and horizontally disposed or, in other words, with two corners at opposite sides of the signal light. Thus the effective transparent field which is defined by the opening 5 may be substantially square or rectilinear, in any case being provided with angular portions at either side.

Secured to the inner face of the plate 3 are a pair of swinging shutters 6. Each of the latter may be of substantially triangular form with a pivotal support 7 such as a sleeve mounted on a screw securing the apex portion thereof to plate 3. If desired a suitable covering plate 103 similar in dimensions to the plate 3 may be located without the same in order to cover the rivet ends and the like upon the plate 3 and to provide the signal light with a finished appearance.

Figures 5, 6:
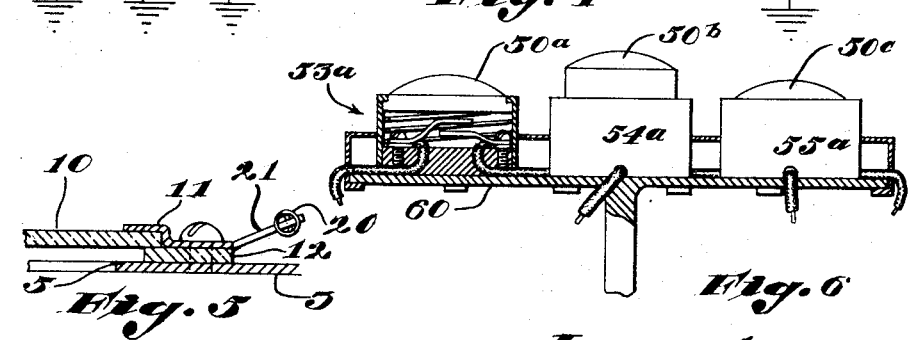
Fig. 5 is a sectional detail.
Fig. 6 is a sectional and elevational view of the switch element assembly.

A suitable colored screen 10 of red glass or the like preferably is secured to the plate 3. The screen 10 if desired may have one face frosted, or the plate 4 may be thus treated, so that suitable diffusion of the light rays which pass therethrough occurs and so that the image of a filament in the light source is not clearly visible. Suitable clips 11 may be arranged about the screen 10, the edge of the screen and the clips being arranged in engagement with spacer elements 12, (Fig. 5) which serve to space the glass from the metal plate 3 to provide a suitable space for the shutters 6. The spacer elements 12 also may act as stops to engage the sides of the shutters, limiting the movement of the same in either direction.

Electromagnets 15 preferably are secured to the plate 3 adjoining each of the shutters 6, these magnets being provided with core portions that are extended as designated by numeral 16 to provide means securing the magnets in place. The magnets may be provided with heads 17 of non-conducting material, which are adapted to engage the plate and to hold the windings of the magnets spaced therefrom. The portions of the shutters 6 which adjoin the magnets are provided with outstanding lugs or tabs 19. The latter may be arranged upon suitable strips 20 which have their end portions bent up to provide the upstanding lugs 19. These lugs are arranged to act as armatures so that energization of the corresponding magnet will result in the attraction of the adjoining portion of the shutter and the pivotal movement of the latter. The lugs 19 which are opposite the magnets are secured to tension springs 20, the opposite ends of which are connected to extensions 21 of the retaining clips 11.

Normally the springs serve to hold the shutters in the position shown in Fig. 1 i. e., so that the armature elements 19 are spaced from the magnets. However, energization of either of the magnets will cause the corresponding shutter to be swung, (see for example the full-line position of the upper shutter in Fig. 3). Thus the triangular shutters are arranged so that the base portions of the triangles formed thereby may define the bar of an arrow and so that the sides may cooperate with the sides of the opening 5 in defining an arrow head, the direction of the arrow depending upon the positions of the shutters. Thus the lower shutter in Fig. 1 is normally located in a position suitable to define an arrow pointing to the left, energization of the magnet controlling the upper shutter being sufficient to change the shape of the illuminated field and to cause an arrow pointing toward the left to be defined. On the other hand, if the arrow is to point in the opposite direction, the upper shutter remains fixed and the lower magnet is energized to move the corresponding shutter and cause the arrow to be defined as pointing toward the right. Ordinarily the irregular red field defined by the shutters and the sides of the opening 5, as shown in Fig. 1, is suitable to provide an appropriate warning indication similar to that of the conventional tail light.

A suitable light source 30 is arranged preferably in appropriate relation with a reflector 31 at the rear of the plate 3 and the elements mounted thereon. For this purpose a suitable standard socket may be mounted upon the rear of the casing 1, being supported by suitable legs 32. Suitable openings 35 and 36 are provided in the reflector and casing respectively to permit light rays to be cast downwardly from the bulb 30 to a suitable license plate which may be mounted upon the metal license plate support 37 which may be secured to the end of the casing 1. Any suitable curved transparent element 38 may be arranged about the opening 36.

Figure 4:
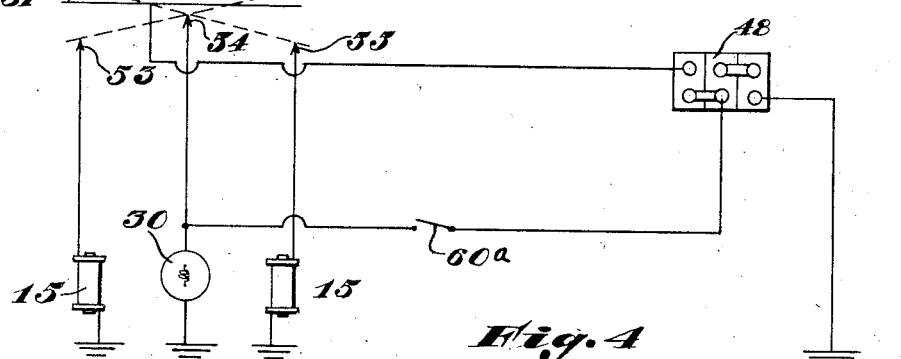
Fig. 4 is a wiring diagram.

Fig. 4 provides one typical wiring diagram which illustrates a convenient means of connecting a signal light of this character with a conventional lighting circuit and appropriate controlling switches. Preferably this controlling circuit is so arranged that the bulb 30 may be energized by the full voltage of the electrical supply source 48, such as the battery or the generator, when the direction indicators are actuated, while a reduced voltage is provided in order to make the device function as a conventional tail light. Preferably a suitable three-contact switch, designated by numeral 50, is provided to control the electromagnets and the energization of the light which corresponds to the actuation of the shutters.

This switch preferably may, for example, be provided with a suitable contact bar 51 which is adapted to engage contacts 54 and 53 or 54 and 55 when pressed toward the same, the engagement of the bar with the first-named pair of contacts causing energization of one of the electromagnets and the bulb 30, and engagement of the other pair of contacts with the bar causing energization of the other magnet and the bulb 30, it being evident that in either case, due to the illustrated parallel arrangement of the leads, the bulb may be provided with the full voltage from the battery 48 or any other suitable source of current.

Accordingly the bar 50 will be pressed in one direction to cause the formation of an arrow image pointing in that direction and the energization of the light source behind said defined image, and the bar will be pressed in the other direction to cause the suitable formation of a pointer and energization of a light source beyond the same indicating that the vehicle is to be turned in a corresponding direction.

The tail light circuit may be controlled by a suitable switch 60$^a$ which preferably is connected to an intermediate post upon the battery. Thus, for example, when the bulb 30 is supplied with energy through the contact 54 it may receive six volts and when it is supplied with energy through the switch 60$^a$ it may receive four volts. While obviously the switch 50 may be arranged in various ways, I preferably provide a switch of this general character on the conventional clutch pedal 60 of the vehicle, Fig. 6. While for convenience of illustration in the wiring diagram of Fig. 4, I have shown a single contact bar 51 arranged to engage the elements 53, 54 and 55, I preferably provide separate buttons 50$^a$, 50$^b$ and 50$^c$, upon the pedal, which function in the same manner as the bar 51, diagrammatically indicated in Fig. 4. It is evident that the intermediate button 50$^b$, which controls the switch element 54$^a$, that is connected to the light 30, projects outwardly beyond the buttons 50$^a$ and 50$^c$, which control the switch elements 53$^a$ and 55$^a$, respectively, that are connected to the electromagnets 15, and which correspond to the contact elements 53 and 55 of Fig. 4. Accordingly, it is evident that by twisting the foot in one direction the buttons 50ᵇ and 50ᶜ may be pressed inwardly to energize the light 30, and the electromagnet defining a pointer directed to one side of the vehicle, while the foot may be twisted in the other direction and pressed against the buttons 50ᵃ and 50ᵇ to energize the light 30 and to define a pointer directed toward the opposite side of the vehicle. This arrangement of the switch controlling elements upon the clutch pedal is advantageous, since ordinarily the left foot of the operator is not being used when the vehicle is about to be turned. Thus, there is no necessity for the operator removing his hands from the steering wheel at a time when it is most essential that he have the use of both hands to control the same.

It is evident that the buttons 50ᵃ, 50ᵇ and 50ᶜ, may be so arranged that a straight downward push of the foot may result in the energization of all three of the controlled circuits. This results in the swinging of both of the shutter elements, while causing the energization of the light 30 with the full voltage of the current thus causing a bright flash and thus tending to attract the attention of the drivers of neighboring vehicles.

If desired, the operator's foot may be rocked from side to side to cause a wigwag effect or swinging of the shutters in opposite directions and repeated energizations and de-energizations of the light source. It is thus evident that I have provided a signal light which is adapted not only to comprise a tail light but to act as a direction indicator and also as an attention or stop light.

I claim:

1. A direction indicator comprising a light source, a translucent screen, means associated therewith to provide an opening visible through the screen, said opening having angularly disposed edges at each side of the screen, a pair of shutters between the source and screen, said shutters being movable into a plurality of relative positions to cooperate with said opening in varying the shape of the image visible through the translucent screen when rays from the light source are cast thereon, the shutters having a normal inactive position, one of said shutters being movable from said position to cooperate with the other shutter and the opening to form an arrow directed to one side, the pointed portion of the arrow being defined by the angularly disposed edges at one side of the opening, and the other of said shutters being movable from said position to cooperate with the first shutter to form a pointer directed in the opposite direction.

2. A direction indicator comprising a translucent screen having an effective field of substantially rectangular form with corners at its upper and lower portions, a swinging shutter pivoted adjoining each of said corners, said shutters being of generally triangular form, with an apex at the pivot and with straight sides arranged to swing to either one of two positions wherein one of said sides will be juxtaposed to the side of the rectangular field and the other of said sides will define an edge of an arrow head, the bases of said triangular shutters defining the arrow bar in each position.

3. A direction indicator comprising a translucent screen having an effective field of substantially rectangular form with corners at its upper and lower portions, a swinging shutter pivoted adjoining each of said corners, said shutters being of generally triangular form, with an apex at the pivot and with straight sides arranged to swing to either one of two positions wherein one of said sides will be juxtaposed to the side of the rectangular field and the other of said sides will define an edge of an arrow head, the bases of said triangular shutters defining the arrow bar in each position, means yieldably holding one of said shutters in a position to form one arrow head, and the other shutter in a position to form the other head, and means selectively operable to move one or the other of said shutters to cooperate with the other shutter and in forming an arrow.

4. A direction indicator comprising a light source, a translucent screen having an effective field of substantially rectangular form with corners at its upper and lower portions, a swinging shutter pivoted adjoining each of said corners, said shutters being of generally triangular form, with an apex at the pivot and with straight sides arranged to swing to either one of two positions wherein one of said sides will be juxtaposed to the side of the rectangular field and the other of said sides will define an edge of an arrow head, the bases of said triangular shutters defining the arrow bar in each position, electromagnets in circuit with the light source to swing either one or the other of said shutters to its arrow forming position.

5. A combined tail light and direction indicator comprising a colored screen, means to define the images of pointers upon the screen, a light source behind the screen, a casing about said light source, an opening in the casing to permit light rays to be cast through the same upon a license plate, and means to make the light source have greater or less intensity, said means being arranged so that the intensity will be greater when a pointer image is defined upon the colored screen.

6. A direction indicator comprising a casing having an open end, a rim detachably secured to said casing, a plate defining a rectilinear opening visible through the screen, a pair of substantially triangular shutters, said shutters having apex portions pivotally mounted on the plate adjoining corners of the opening, armatures upon the apex portions of each of said shutters and electromagnets disposed adjoining opposite margins of the opening and behind the plate, and yieldable means holding the shutters so that their respective armatures are spaced from the corresponding magnet, energization of either magnet being effective in attracting the corresponding shutter so that the latter cooperates with the sides of the opening and the other shutter in defining a pointer.

Signed by me at Boston, Massachusetts, this 16th day of July, 1928.

JOSEPH W. FLENNIKEN.